United States Patent
Doshi et al.

(10) Patent No.: US 9,514,459 B1
(45) Date of Patent: Dec. 6, 2016

(54) IDENTITY BROKER TOOLS AND TECHNIQUES FOR USE WITH FORWARD PROXY COMPUTERS

(75) Inventors: Kshitij A. Doshi, Springfield, NJ (US); Hashem Mohammad Ebrahimi, Salt Lake City, UT (US); Carolyn B. McClain, Springville, UT (US)

(73) Assignee: EMC Corporation, Hopkinton, MA (US)

( * ) Notice: Subject to any disclaimer, the term of this patent is extended or adjusted under 35 U.S.C. 154(b) by 3063 days.

(21) Appl. No.: 09/809,501

(22) Filed: Mar. 15, 2001

Related U.S. Application Data (60) Provisional application No. 60/191,796, filed on Mar. 24, 2000.

(51) Int. Cl.
*G06Q 20/38* (2012.01)

(52) U.S. Cl.
CPC .................... *G06Q 20/383* (2013.01)

(58) Field of Classification Search
CPC .......................... G06Q 20/00–20/383
USPC ........ 705/64, 65, 66, 67, 68, 69, 70, 71, 72, 705/73, 74, 75, 76, 77, 78, 79; 709/217, 709/218, 219
See application file for complete search history.

(56) References Cited

U.S. PATENT DOCUMENTS

| | | | |
|---|---|---|---|
| 5,349,642 A | 9/1994 | Kingdon | |
| 5,729,537 A * | 3/1998 | Billstrom | 705/13 |
| 5,774,670 A * | 6/1998 | Montulli | G06Q 30/0603 709/203 |
| 5,913,025 A | 6/1999 | Higley et al. | |
| 5,920,404 A | 7/1999 | Weiser | |
| 5,961,593 A * | 10/1999 | Gabber et al. | 709/219 |
| 5,982,507 A | 11/1999 | Weiser et al. | |
| 6,003,084 A * | 12/1999 | Green | H04L 29/06 709/203 |
| 6,081,900 A | 6/2000 | Subramaniam et al. | |
| 6,085,030 A | 7/2000 | Whitehead et al. | |
| 6,112,228 A | 8/2000 | Earl et al. | |
| 6,212,558 B1 | 4/2001 | Antur et al. | |
| 6,243,815 B1 | 6/2001 | Antur et al. | |
| 6,253,193 B1 * | 6/2001 | Ginter et al. | 705/57 |
| 6,401,125 B1 * | 6/2002 | Makarios | H04L 67/02 709/219 |
| 6,993,476 B1 * | 1/2006 | Dutta | G06F 17/30569 704/2 |
| 7,146,505 B1 * | 12/2006 | Harada | G06Q 20/206 705/18 |

OTHER PUBLICATIONS

M. Reed, et al., Proxies for Anonymous Routing, http://www.onion-router.net/Publications.html, (c) 1996, pp. 1-10.

(Continued)

*Primary Examiner* — Calvin L Hewitt, II
*Assistant Examiner* — Cristina Sherr
(74) *Attorney, Agent, or Firm* — Barry N. Young (57) ABSTRACT

A forward proxy can perform identity substitutions and related services. The user provides the forward proxy with identity information, and the forward proxy presents itself to remote Internet sites on behalf of the user in the guize of the specified identity. From the remote site's point of view, the forward proxy is the machine being used by the user; the identity of the actual user machine can be hidden. Cookies are thus stored and updated at the forward proxy instead of being stored and updated at the user computer as they would be if a conventional forward proxy had been used. This helps preserve user privacy. The use of group identities, which are shared by multiple users, are also facilitated.

14 Claims, 4 Drawing Sheets

(56) References Cited

OTHER PUBLICATIONS

D. Goldschlag, et al., Onion Routing for Anonymous and Private Internet Connections, http://www.onion-router.net/Publications.html, Jan. 1999, pp. 1-5.
P. Syverson, et al., Private Web Browsing, http://www.onion-router.net/Publications.html, Jun. 2, 1997, pp. 1-13.
Michael G. Reed, et al., Anonymous Connections and Onion Rotuing, http://www.onion-router.net/Publications.html, (c) 1997, pp. 1-15.
Meyers, J., Simple Authentication and Security Layer (SASL), Request for Comments 2222, Network Working Group, Internet Engineering Task Force, http://www.ietf.org, (c) 1997, pp. 1-16.
Cookie Jar 2.0, Eric Murray Consulting, http://www.Ine.com/ericm/cookie_jar/, (c) 1999, pp. 1-7.
Internet Junkbuster Frequently Asked Questions, http://www.junkbusters.com/ht/en/ijbfaq.html, (c) 2000, pp. 1-25.
I. Goldberg, et al., Freedom Network 1.0 Architecture, Zero-Knowledge Systems, Inc., Nov. 29, 1999, pp. 1-14.
Onion Routing, http://cosmo.marymount.edu/~vmb34180/Onion-Routing.html, (c) 2000, pp. 1-20.
Chapter 7 Reverse Proxy, http://developer.netscape.com/docs/manuals/proxy/adminux/revpxy.htm, (c) 1997, pp. 1-8.
1997 Project Summary Onion Routing: Anonymous Communications Infrastructure, Nval Research Laboratory, http://www.darpa.mil/ito/Summaries97/E922_0.html, (c) 2000, pp. 1-2.
J. Parodi, et al., Integrating ObjectBroker and DCE Security, Digital Technical Journal, vol. 9, No. 1, 1997, pp. 42-48.
U.S. Appl. No. 09/484,691, Ebrahimi et al.
U.S. Appl. No. 60/191,796, Doshi et al.
U.S. Appl. No. 09/670,783, Mellmer et al.
Myers, J., "Simple Authentication and Security Layer (SASL)", RFC 2222, Internet • Engineering Task Force, Networking Group, pp. 1-16.
Franks, J., et al., "HTTP Authentication: Basic and Digest Access Authentication", RFC 2617, Internet Engineering Task Force, Networking Group, pp. 1-34.

\* cited by examiner

IDENTITY BROKER TOOLS AND TECHNIQUES FOR USE WITH FORWARD PROXY COMPUTERS

RELATED APPLICATIONS

This application claims priority to commonly owned application Ser. No. 60/191,796 filed Mar. 24, 2000, which is incorporated herein by reference; in the event of inconsistency, the present application prevails over incorporated material.

FIELD OF THE INVENTION

The present invention relates to user identification and authentication information in a computer network, and relates more particularly to tools and techniques for managing user identities and "cookie" data structures at forward proxy computers.

TECHNICAL BACKGROUND OF THE INVENTION

On the Internet, browsers or clients locate the objects that they want to access, and the servers where the objects reside, through a variety of means. Most often they do so by either using directories and search engines, or by using links embedded in other objects that the clients already possess. Regardless of how they determine which objects to access and where to access them from, when the clients access these objects their accesses can be routed through a network of one or more intermediaries (called "proxies") between the requesting clients and the providing servers.

Usually, these proxies fulfill two broad goals that improve the overall quality of accesses over the Internet: (a) when it is possible to do so, the proxies cache frequently accessed objects so that the data can be supplied to the requesters quickly and with frugal use of physical data paths, and (b) some of these proxies can perform certain automated functions such as redirecting accesses to occur from proximal sources and enforcing certain access control policies at boundaries between organizations. Both of these functions are beneficial precisely because they can be applied to accesses that are mediated by the proxies; a non-mediating machine, or a machine that acts as a mere physical router of data generally cannot provide these benefits.

Forward proxies are used today to provide mediated points of access, where web traffic can aggregate, so that access controls can be applied on the proxy in addition to caching frequently accessed objects. Commercial offerings of forward proxy products from major vendors tend to be competitive in offering sophisticated types of filtering of these objects, anonymity at the "IP" address level (i.e., stripping out identity information such as the IP addresses), and features such as logging, auditing, and metering of accesses.

Unfortunately, because many of the semantic aspects of client-server interaction are transparent to proxies and because many proxies are themselves expected to provide semantically transparent behavior, the use of proxies as brokers in sophisticated ways to identify users and web sites to each other tends to be minimal. Such behaviors are conventionally provided either at browsers or at web sites. Browsers are extended by agents that control cookies, help with automated logins into web sites, and so on. Servers are extended by agents (e.g., NetEgrity software) that intervene to authenticate the user and then provide access controls based on user identity.

In particular, an "end-to-end state management problem" makes it difficult to perform identity-related management tasks at a forward proxy. It will be apparent after studying the present invention that value can be added to Internet accesses if a system is able to handle an end-to-end interaction between client and server as a composite of three semantically separable interactions: between client and the proxy (client-proxy session), between proxy and the server (proxy-server session), and between the client-proxy and proxy-server sessions, and proxy based services. This separation is generally defeated in conventional systems because the identity component of requests sent from a client to a server is not fully transparent to the proxy. When a browser sends a request to a web server, it sends along with it some data that is specific to the web server (or specific to the domain to which the web server belongs). This data is placed at the browser by the web server, may be altered by the web server in the course of its interactions with the browser, and may persists across sessions.

The web server may use such "cookies" data for a variety of means. Cookies are perhaps most commonly used to: know who the user is, so that the server can personalize the service offered in accordance with user's preferences; maintain and update state at the server on behalf of the user, so that the user's interactions with the server are effectively bookmarked for session-to-session continuity; and/or maintain state within a session with the user across multiple interactions.

Cookies pose a problem for identity substitution. Conventionally, proxies dutifully forward the cookies that they receive from the user on to the server (some conventional proxies block cookies, creating problems by limiting server offerings). The use of cookies can reveal the user's true identity to the server. For example consider this interaction:
  (a) Client contacts a web site to receive stock quotes for some equities.
  (b) The client's browser inserts a cookie into the request, which is meant for interpretation at the server.
  (c) The server examines the cookie, and based upon the value of the cookie, retrieves a profile about the client that is maintained at the server.
  (d) The profile tells the server which equities and what types of information should be supplied to the client.
  (e) The server retrieves the requested information and sends to the client.

In the above interaction, the cookie that is transferred in step (b) is opaque to a proxy. In this case, while one can mechanically split the end-to-end communication into the three component interactions noted above, the communication cannot be semantically separated because the proxy cannot derive or add meaning to the original interactions. Thus, cookies that are intelligible only at the server are a significant obstacle to creating intelligent identity mediation at proxies. Even when they don't reflect personally identifiable information, cookies have privacy implications. As users visit sites, it becomes possible to track them because of the cookies that they use, and to know what they are doing at those sites. Companies may use such information for commercial purposes such as tailoring insertion of advertisements. Cookies also enable tracking a user across different web sites by third party arrangements among web sites (e.g., using DoubleClick cookies). A conventional forward proxy can defeat simple types of identity inferences at the server (such as those based on the client's Internet address) by submitting to the server a request whose source is the proxy itself and not the client, but such a proxy cannot simply replace cookies that may have information other than identity incorporated into them without risking a reduction or loss of the functionality provided by the site.

Also, cookies are not the only problem. Many cookie-less interactions also involve end-to-end state maintenance that is set in motion as follows: when the client contacts a server, the server first asks the client to sign on with a valid user identifier (and almost always, a password). Once the user signs on, the server associates server-side state for the duration of a session on behalf of the signed-on client. Interactions that occur in this way are just as opaque to the proxy as the cookies were, since the proxy cannot alter the client's request without control over how the server side state affects the processing of the request.

Accordingly, it would be an advancement to provide new tools and techniques for coordinating user identity management with cookies. Such tools and techniques are described and claimed herein.

BRIEF SUMMARY OF THE INVENTION

The invention provides tools and techniques which exploit the knowledge that a forward proxy has of the identity of the principal that is performing accesses through the proxy. For instance, in some embodiments a forward proxy performs directed identity substitution on the accesses that it mediates, so that users performing the accesses can control the disclosure of information that helps identify them. Users can also have aliases for protecting long-term and sensitive personal information. In some embodiments, the forward proxy performs mappings (either autonomously or as directed by users), from individual to group identities for the accesses it mediates. This aggregates individuals into groups. Such aggregation has uses such as simplifying access control, simplifying authentication, simplifying the licensing of resources, and promoting common interests of a group through advocacy. Sometimes the forward proxy performs directed identity substitution so an individual may select different roles or personas when requesting different web sites. Such substitution may provide anonymity. More generally, personas permit an individual to customize his/her experience of a web site and to make that experience somewhat independent of the configuration of the machine he/she uses to access the web. Forward proxies may also use the identity of a principal with whom the proxy has a session when making quality control and access control decisions that are applicable to the traffic on that session; such decisions that are not necessarily visible to the principal.

There is a subtle but important distinction between realizing these benefits through the use of browser customizations or extensions and realizing them through the forward proxy as an intermediary. Identity substitution or mapping for the benefits above (other than access and quality control) can be performed at the browser by using well understood techniques, some of which may be automated by using programmable extensions to browsers. But this may require considerable expertise not available to lay users, whereas they are more easily supplied and administered at a forward proxy. In addition, if information such as the machine address of the browser is revealed (despite best efforts) then that revelation weakens user anonymity and privacy; such revelations are not as likely when a forward proxy mediates the identity substitution or mapping under the direction of the user according to the invention. By delivering features at a forward proxy instead of a browser, the invention also provides independence from the operating system and browser software on the client machine. Aggregation of users is also more efficiently and effectively done at a forward proxy with the invention.

In one embodiment, the invention provides an Internet access system for use by a person, the system comprising a user computer configured with an Internet browser for use by the person in communications between the user computer and the Internet, wherein the information and requests being transmitted between the user computer and the Internet lie in at least the following overlapping categories: identity information which promotes remote web server identification of at least one of the person and the user computer used by the person, identity-independent information which does not assist remote web server identification of the person and does not assist remote web server identification of the user computer, pure history information which assists a remote web server in recording a history of the person's interactions with the remote web server and which does not include identity information, blended history-and-identity information which includes identity information and also assists a remote web server in recording a history of the person's interactions with the remote web server, and identity-requesting information which requests identity information about at least one of the person and the user computer used by the person.

In the system, a forward proxy computer connectable to the user computer is also separately connectable to remote web servers in the Internet. The forward proxy computer rather than the user computer is identified to remote web servers, in response to identity-requesting information, as the computer being used by the person. The forward proxy server is configured to at least: forward to the remote web servers requests for information made by the person using the user computer, forward identity-independent information from the Internet to the user computer, filter the transmission of identity information and of blended history-and-identity information from the user computer to the Internet, and stand in place of the user computer as a recipient of identity information, as a recipient of blended history-and-identity information, and as a recipient of identity-requesting information, when such information is sent from the Internet toward the person.

An identity broker data structure is stored on or otherwise accessible to the forward proxy computer but not accessible to the remote web servers. The identity broker data structure associates the principal (at least one of the person and the user computer) with a plurality of identities. Each such identity has web site presentation information stored in the identity broker data structure; the web site presentation information is for presentation to a web site for performing at least one of: identifying to a remote web server the person who is using the user computer, and authenticating to a remote web server the person who is using the user computer.

In addition, at least one writable cookie data structure which was received from a remote web server is stored on the forward proxy computer. The cookie data structure includes at least one of identity information, pure history information, and blended history-and-identity information. The cookie data structure is not stored on the user computer in a location that is written in direct response to requests from a remote web server if the forward proxy computer determines that the cookie data structure includes at least one of identity information and blended history-and-identity information and if the forward proxy computer has not been expressly instructed by the user to transmit the cookies to the user computer to be contemporaneously stored there.

In some embodiments, one or more of the following also holds true: the identity broker data structure identities comprise a group identity which is shared by multiple persons, such as employees of a single entity, and the web site presentation information is provided pursuant to a site license granted to the entity for use of the web site by entity employees; the identity broker data structure identities comprise an anonymous identity and the system suppresses identity information comprising a network address of the user computer; for a particular web site the identity broker data structure stores only one set of web site presentation information, and associates only one identity with that particular web site; the forward proxy computer makes a quality of service determination regarding a communication request based at least in part on which identity in the identity broker data structure makes the communication request; the forward proxy computer makes an access control determination regarding a communication request based at least in part on which identity in the identity broker data structure makes the communication request; the forward proxy server is configured to rewrite HTTP GET and HTTP POST requests by substituting into them web site presentation information from the identity broker data structure; and the forward proxy server is configured to apply all SET_COOKIE commands at the forward proxy server rather than allowing them to be applied at the user computer.

The invention also provides methods for using such proxies, for coordinating cookies with specified user identities, and for other identity-related services at forward proxies. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing embodiments of invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file. In particular, an "embodiment" of the invention may be, without limitation, a system, an article of manufacture, a method, and/or a computer memory, CD, disk, or other digital or analog medium that is configured according to the invention.

Introductory Examples

To illustrate potential benefits of the invention, several scenarios for its use are provided below. Different embodiments of the invention, and different uses of it, may provide different and/or additional benefits.

Group Identification/Authentication. A corporation funnels all external Internet accesses from browsers inside the corporation through a collection of inventive forward proxies. The corporation has site licenses for accesses to several web sites. Ordinarily, the licenses are enforced by a collection of passwords, one for each web site; these passwords are distributed to the various employees and partners of the corporation. By mapping from individuals' identities to a group identity that represents the corporation's inventive forward proxies to these web sites, the entire licensing process and authentication to licensed websites becomes transparent to the employees and partners of the corporation.

Anonymity. An organization wishes to provide its clients with the ability to remain anonymous when accessing some collection of web sites. A novel forward proxy that is under the administrative control of the organization and which can suppress identity information (network addresses of browsers, HTTP cookies, and so on) can accomplish this task.

Community. At a novel forward proxy user identities are mapped to community or group identities under the control of each user. The basis for such mapping is voluntary association by individuals to group identities that the individuals wish to promote. One potential reason for such group associations is to strengthen the ability for the group to demand and receive from web sites concessions that are normally denied to individuals. For example, boycotting a privacy abuser may be more effective when the boycott is identifiably by a group. Community based aggregation is also useful in deriving economies of scale and administration when employed by large groups.

Federated Identification. In business-to-business supply chain integration, identification and access control may be performed in two steps. The consumer organization uses an inventive proxy to authenticate its own users, and then presents authenticated users to the resource provider organization for further service, employing a group identity for any of the users that it has already authenticated. Such identity presentation may be in the form of a secure (relatively difficult to forge) cookie or some other background exchange of credentials between the forward proxy and the resource provider. Any request from the web site for authentication of the group identity may be satisfied at the proxy itself, either transparently or through minimal human intervention.

Personalization. The novel proxy remembers an individual user's preferences when the user accesses the web as one of several user personalities, and uses this information to personalize the user's interactions with web servers. In addition, the proxy uses a quality-of-service discriminator on each session with the identified users. Thus, the level of service is based at least in part on their individual identity, role, group identity, etc. For instance, the inventive proxy may use identity as a discriminator when making resource allocation decisions.

There is one aspect of mediation or identity brokering that is unlikely to be used with the invention, namely, configurations in which the forward proxy acts as a tunnel for an end-to-end Secure Sockets Layer (SSL) dialogue. Unless the security requirement that an SSL channel provides can be safely delegated to the forward proxy (without an unacceptably increased risk of legal liabilities, for instance), the forward proxy cannot intervene to change, substitute, and/or otherwise manage identity information. In practice, SSL is employed primarily with the assurance that the server is indeed trusted not to misuse the identity information from a user. Accordingly, when SSL is used for business purposes such as banking, the anonymity or privacy concerns that might otherwise be addressed by the identity management tools and techniques of the invention can be addressed instead through the legal frameworks within which these business activities occur.

Architectural Overview

Figure 1:
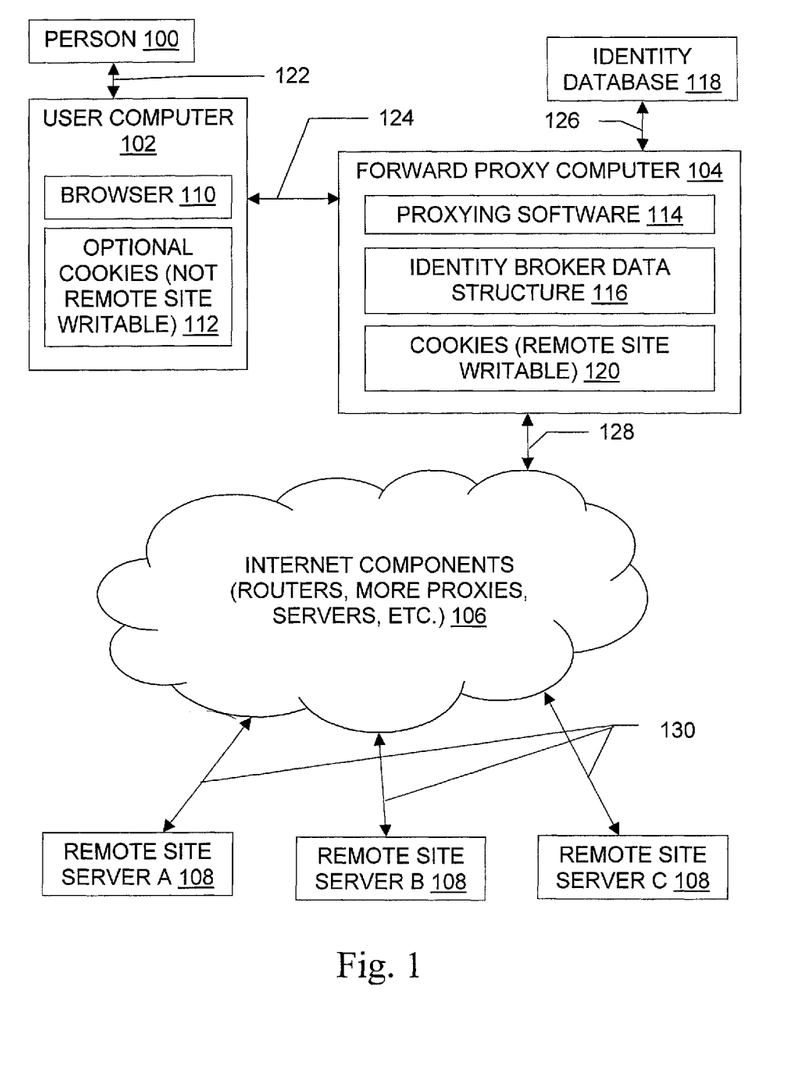
FIG. 1 is a schematic diagram illustrating the architectural context of a forward proxy computer in a computer network which operates according to the invention.

FIG. 1 illustrates generally systems according to the invention, and by way of describing the behavior of system components also illustrates methods and configured storage media according to the invention. A human 100 communicates 122 with a user computer 102 to access remote Internet sites 108 such as web sites, FTP sites, etc. The user computer may be a workstation, laptop, handheld, disconnectable mobile computer, server, computing cluster, or mainframe, for instance. The user computer is configured with a browser 110, such as a Microsoft or Netscape browser.

The user computer 102 communicates 124 with a forward proxy computer 104 which includes proxying software 114. The proxying software 114 may perform familiar functions such as access control, filtering, single-sign-on, and caching, in addition to the novel identity management functions described herein. Access control, filtering, single-sign-on, and caching are not, in and of themselves, the present invention. However, combining filtering and/or access control with the identity services of the invention can provide finer control (smaller granularity) than conventional approaches. An identity broker data structure 116 assists the forward proxy computer 104 in performing its identity management functions. The identity broker data structure 116 may be stored in the forward proxy computer 104, or it may be stored or accessed 126 through another computer, in an identity database or directory 118.

The forward proxy computer 104 communicates 128 with various other computers 106 in order to reach the remote sites 108 to at least attempt to obtain the information desired by the user 100. Communications 124, 128, 130 generally are performed using TCP/IP protocols to send information in the form of HTTP exchanges.

In this context, the following tools and techniques may be used in the illustrated system (or similar inventive systems) to make a forward proxy 104 serve as an intermediary in user identification according to embodiments of the invention.

First, in place of having a user 100/102 sending identifiable information to a server 108 (such as a cookie or a filled up form), let the proxy 104 do so under user control. Assume that the proxy 104 has received instructions from the user (or equivalently, from an administrator) detailing how the user should be identified on outgoing requests that the proxy 104 sends on behalf of the user. The proxy 104 uses these instructions to rewrite the HTTP GET or POST requests, to substitute within each request components that may be used to identify the user 100/102. Generally, these components include IP address, E-mail address, cookies, filled-up forms, and other information such as the HTTP Referrer header. Some or all such information can be replaced at the proxy 104 with pre-configured information that has been uploaded to the proxy, as described for instance in the following point.

Second, provide controls by which an end-user 100 or an administrator can "upload" identity information to the proxy 104. For instance, a control interface can be used to generate configuration files which are the means of feeding and updating configuration files to the proxy 104. Such a tool preferably runs in a variety of hosting environments, and can be used by non-experts 100 to rapidly specify how the proxy 104 should transform information before sending it to browsers 110 or servers 108.

Third, allow the user 100/102 to direct the proxy 104. For instance, provide interfaces by which a user 100 can specify to the proxy 104 (without requiring scripting or programming by the user 100) how the proxy 104 shall select which one of several synthetic identities to inject into any request 128 made by the proxy 104 on behalf of the user. Alternative means for achieving this include, without limitation: (i) The proxy 104 sends an applet to the browser 110, which opens a control pane at the browser, through which the user 100 can initiate an interaction with the proxy 104 at any time. Once the interaction is initiated, it is straight-forward for the proxy 104 to receive control and present to the user a sophisticated menu for identity transformations to be memorialized for the proxy 104 in the identity broker data structure 116. (ii) Users 100 can be instructed in the process of bookmarking a proxy 104 URL through which they may ask the proxy to initiate a similar interaction to set information in the identity broker data structure 116.

Fourth, keep tracking information at the proxy 104. To reduce or defeat invasion of privacy and accidental compromise of user's true identity, the proxy 104 should represent the user 100/102 with substituted identity across more than a single session (possibly indefinitely). Without the invention, cookies are set at a browser by each web site 108 and can track a user's interaction with that web site and others, over long periods of time (far exceeding session lifetimes). This makes it possible, over time, to reveal more details about the real identity of the user 100. To avoid this, a proxy 104 should be the point of cookie storage and submission, thereby isolating the user from direct identity interactions with web sites. A "Cookie-Jar" feature or similar feature in proxy software 114 extracts, stores, modifies, and resubmits cookies as directed by the rest of the proxy software 114. The "cookie jar" 120 in and of itself is not claimed as the present invention. Note that the commercially available Junkbusters proxy software logs cookies to a so-called cookie jar. Another advantage of this approach is that users 100 can freely navigate the web, while keeping their "cookie" files on their browsers 110 in read-only mode, so that compromise of identity through cookies is less likely.

Figure 2:
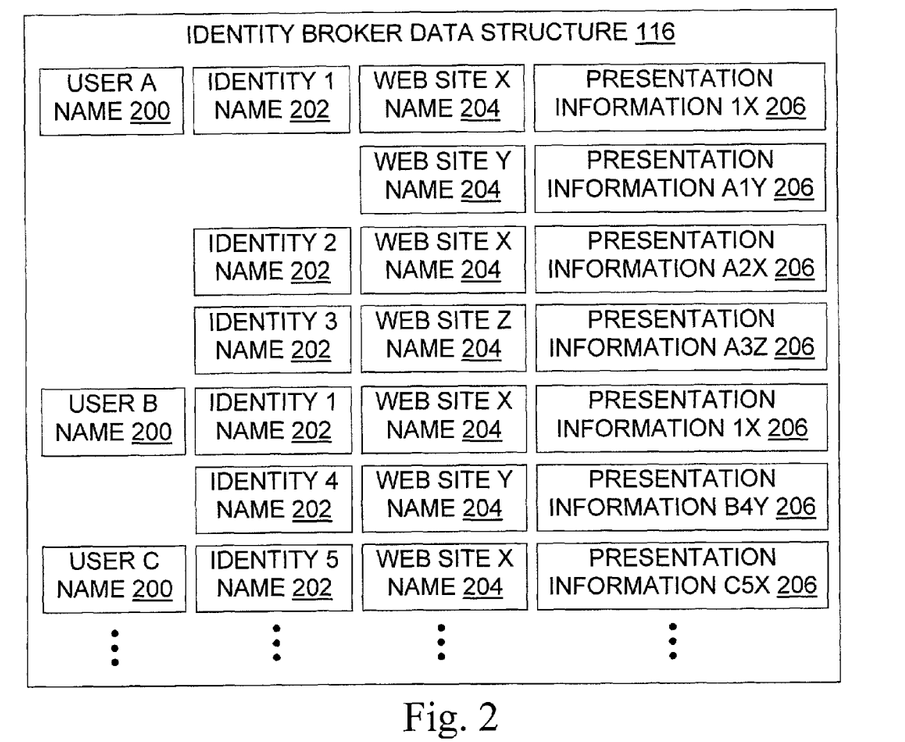
FIG. 2 is a diagram further illustrating an identity broker data structure shown in FIG. 1.

In the context of the present invention, a cookie storage feature 120 preferably helps provide an option whereby, at the user's discretion, all SET_COOKIE commands would apply at the proxy 104 itself. SET_COOKIE execution at the proxy 104 for a given user 100 is within the specific context of the identity 202 that that user 100 has chosen to present to the web server 108. That is, if the same user visits the same web site 108 on two different days (e.g., one day as Dr. Jekyll and another day as Mr. Hyde), then SET_COOKIEs on those two days apply to further respective state preservation on behalf of the two identities and do not ordinarily interfere with each other.

Fifth, provide a generally optional automated login support module in the software 114. As noted, embodiments of the invention are generally limited to normal (i.e., non-SSL)

channels of communication 128, 130 in which the proxy 104 mediates to provide alternate identities to users when conveying their requests to web sites 108. Once a user logs into a first forward proxy 104, that first forward proxy should be able to automatically login the user 100 at downstream forward proxies (novel or not) and servers, with the appropriate identity credentials required at each point, at least at sites that do not require cryptographically stronger schemes such as digest authentication, or authentication over an SSL connection.

Sixth, provide generally optional tools for system administration and policy configuration. Embodiments may provide capabilities and interfaces to a system administrator, so that he/she can specify how the proxy 104 makes quality-of-service and access-control decisions based on a knowledge of who the users 100/102 are, what time of day it is, which web sites 108 they are accessing, etc. This could be done by extending a policy-nexus module of proxy software 114 to use credentials derived from the identity of the principal 100/102 for each session.

In such an architecture, the proxy 104 can employ the above tools and techniques and those described elsewhere herein to achieve identity substitution, anonymity, group identification, and protection of privacy. For instance, the proxy 104 can identify the user through means such as use of a proxy-cookie as described in commonly owned copending application Ser. No. 09/484,691 filed Jan. 18, 2000, which is incorporated herein by this reference. Alternately, the proxy 104 may require that the user 100/102 login with the proxy and associate the user identity with the session between itself 104 and the user 100/102. The proxy 104 receives specific identity management instructions from the user, e.g., at the start of a session between the user and the forward proxy, or at some time during such a session. The forward proxy 104 then applies these instructions as described herein.

Each user-server session between a user 100 and a remote server 108 includes a user-proxy session between the user 100 and the proxy 104 plus a proxy-server session between the proxy 104 and the remote server 108. On a proxy-server session, the user may be identified with the substituted identity as follows. The proxy 104 receives cookies from a web site 108 and stores them, on behalf of the user, at the proxy 104; the proxy 104 discards unacceptable cookies or shortens their expiration time; the proxy 104 submits to the user on user computer 102 pre-filled forms containing identity information from the identity broker data structure 116 about a particular persona or a group identity, to the user so that he/she can submit it with a single click to the web site 108 that requests it; the proxy 104 maintains intra-session and inter-session correspondence between the identities and the cookies or query strings that represent these identities. For each response that is received by the proxy 104 from web sites 108, the proxy delivers personalization of the response to the user, in accordance with preferences set at the proxy 104 for the chosen role/persona.

In implementing, using, or otherwise practicing the invention, it may be helpful to understand the "end-to-end state management problem" one faces when managing exposure of identities on the Internet, and how this is supervened by the invention. The "end-to-end state management problem" was discussed in the Technical Background, and that discussion is incorporated herein. In particular, a key to adding value at a proxy 104 in the middle of communications between users 100 and remote sites 108 is to be able to handle an end-to-end interaction between client 102 and server 108 as a composite of three semantically separable interactions: between client 102 and the proxy 104 (client-proxy session), between proxy 104 and the server 108 (proxy-server session), and between the client-proxy and proxy-server sessions, and proxy 104 based services. This separation is conventionally defeated because the identity component of requests sent from a client to a server is not fully transparent to the proxy.

In order for a proxy 104 to understand or alter the semantics of end-to-end interactions, the proxy 104 should understand and be able to control the exposure of a client's identity in these interactions. Embodiments of the invention reduce or avoid the end-to-end state management problem by reducing or avoiding the interference between browser-based cookies and the proxy-based identity substitution mechanism. A cookie becomes associated with a given user identity, e.g., during a registration or a login procedure. A cookie is created on the basis of the information supplied by the user during such a procedure, although it can be subsequently modified by the web server 108.

With the invention, the remote site 108 registration and the login procedures are performed with proxy 104 participation. Now if a new identity is minted at the proxy 104 to replace a real identity, this is done under control of an end-user, administrator, or other user 100. Thus the proxy 104, in effect, becomes the "browser" or client for the purpose of end-to-end state management. The proxy 104 maintains a copy of the registration/login form as supplied to the server 108 for the new identity.

In addition, all cookie setting requests are executed at the proxy 104. The user computer browser 110 may generally optionally keep copies 112 as well, so that it can operate independent of the proxy 104 (e.g., a laptop 102 may benefit from this). But those copies 112 are not routinely updated by the web servers 108, whereas the cookies 120 on the proxy 104 are routinely updated by server 108 SET_COOKIE commands or the like in the context of the identity specified by/for the user on the proxy 104.

The proxy 104 saves the cookie settings in a persistent database 120 at the proxy 104 or in a location accessible from the proxy. Generally, they would be stored alongside the authentication information 116 discussed above.

In some embodiments, the proxy 104 periodically (or randomly) purges its cookies 120, and forces them to be recreated based on the copy of the registration/login information it had saved. The proxy 104 may also "poison" such cookies (e.g., replace them with random values) so that casual accumulation of server side information is polluted. While corrupting the cookies may not eliminate all cookie abuse at the server 108, it may help create negotiating leverage (based on group strength at the proxy 104) with servers 108 whose privacy practices are objectionable.

Finally, because the proxy 104 provides the ability to the user to resubmit previously filled up login (or other forms) in order to register with little inconvenience, the user 100/102 can be freed from the need to maintain even long term "convenience" cookies, such as those that give the user 100 single-click login behavior at various web sites 108. This allows a user 100 to let those cookies become meaningless to the server 108 by expiring or poisoning them randomly.

More about Cookies

Cookies have been controversial. They afford a high degree of convenience and personalization to the user, but they compromise the user's privacy and can do much long term damage to it. Requiring users to maintain their identity state at an intermediary such as proxy 104 does not address those users that do not have a trusted intermediary 104 through whom they can obtain such a service. It also has limited benefits in the face of sustained attacks on user's privacy that are possible when those sites 108 that the user 100 does visit as his/her true self do not adhere to good privacy policies. Further danger of erosion of privacy lurks in the form of the ability of any collection of sites 108 to seek and find more information about a user's identity by analyzing patterns of access that a user 100 would exhibit across all of his/her fictitious identities. These privacy abuse problems are all centered on the opaque nature of cookies: users 100 have serious difficulty querying or effectively changing the identity information that is revealed about themselves, because the cookies that their browsers store and send are unintelligible to them 100.

This has given rise to several initiatives which are not themselves part of the present invention, including (i) the "P3P proposal" which aims to eliminate abuse of privacy through negotiated agreements in which users specify their privacy requirements and servers communicate their privacy policies, and (ii) TrustLabels which encapsulate P3P policies and serve as cookies, while they reveal to the users the privacy guarantees made by a site that uses a trust label. A forward proxy can play a key role here, by hosting the agents 114 that perform the P3P negotiation or the trust label acceptance decisions.

Figure 3:
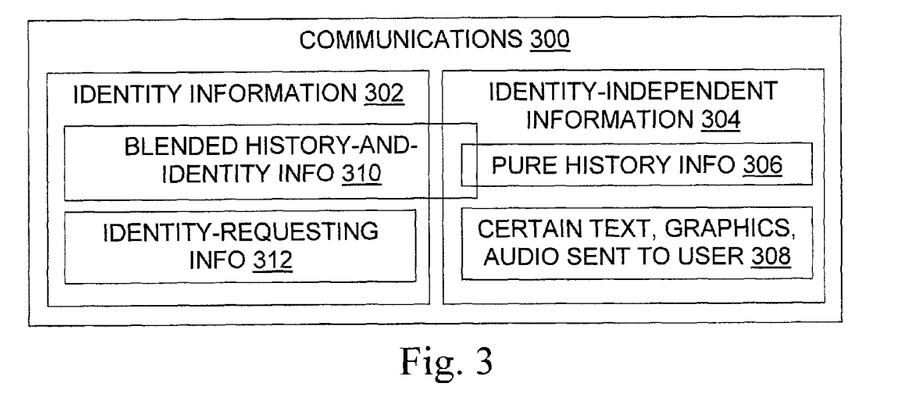
FIG. 3 is a diagram further illustrating network communications shown in FIG. 1.

Going beyond such negotiated privacy agreements, which may themselves be difficult to enforce without adequate legal safeguards, we sketch an alternative that makes cookies less opaque or not opaque at all. Let us distinguish between two types of information that cookies encapsulate. Identity-independent information 304 concerns the state of a user-server session, e.g., cookies that are used to track a basket of stocks on behalf of a user 100, in and of themselves do not need to carry any personal information about the user 100 so long as they can associate with each user descriptor a collection of stocks whose prices the user 100 is interested in. Likewise, if a cookie is used to keep track of a user's last access to a message list or a user's electronic shopping cart, it does not need to know any identity information about the user 100. Identity dependent or identity derived information 302 includes information such as a user's email address, postal address, phone number, fax number, zip code, etc. This information may be legitimately needed in some cases. For example, a weather service 108 or a television listing service 108 may use the user's zip code in order to customize the information that is presented to the user 100.

Cookies that are not opaque in the following sense could reduce or overcome the problem of identity detection. Suppose that a cookie is created by a computer program whose input is a collection of human-readable [KEY, VALUE] pairs, and whose output is the cookie; given the same input, the program always generates the same cookie. The procedure itself can be reasonably easily executed, for example, it may be encoded in a platform independent way. Then the control of manufacturing a cookie can be moved from the server 108 to a client 102 or to a client's proxy 104. Because both sides manufacture cookies based on identical, human-readable input, it is easy to establish confidence that cookies do not reveal any more identity information 302 than the user 100 is willing to provide. A site 108 that has respectable privacy goals may then support the ability of users 100 to substitute remanufactured cookies for the identity-dependent cookies, and allow users 100 to supply no cookies that are identity independent when users want to erase any accumulated session-to-session state. This approach does not require clients 102 to initially change. If a client comprises a legacy browser, the client simply does not take advantage of this cookie-remanufacturing process and works just as well with a server that allows cookie remanufacturing as with one that does not. Cookie remanufacturing is not an essential part of the present invention in every embodiment, but may instead be used in conjunction with identity management at a forward proxy 104 as described and claimed.

Identity Broker Data Structure

FIG. 2 illustrates an example identity broker data structure 116. The structure 116 is shown diagrammatically, with the understanding that it may be implemented in various ways (e.g., with arrays, tables, records, structs, links, pointers, indices, and/or keys) using various programming languages (e.g., C, C++, Java, and/or SQL) and various hardware (general purpose, or special-purpose such as FPGAs, ASICs, etc.), and possibly with enhancements not expressly shown (e.g., data compression, caching, encryption, checksums, and/or digital signatures). The component names and arrangement are illustrative only; in different embodiments the components in this and other Figures may be regrouped, renamed, repeated, omitted, or otherwise altered except as required under proper interpretation of the claims. GUIDs, indices, keys, or other means may be used as identifiers in addition to or in place of the indicated user names 200 and/or identity names 202. Web site names 204 may be in the form of URLs, IP addresses, or other means of identifying a remote site or server 108. Presentation information 206 may include user names, passwords, digital certificates, preferences, and other information used to identify and/or authenticate a user 100 to a remote web site or server 108.

In the illustrated example, User A has three identities, listed in the diagram as identities 1, 2, and 3, respectively. Note that in a given session User A can present either of two different identities (identity 1 and identity 2) to the same web site X. User B has two identities, of which one (identity 4) is unique to User B and the other is a group identity shared with User A (and perhaps with other users as well). The particular combination of users, identities, and web sites shown in FIG. 2 is only one example; different combinations will often be present in various embodiments of the invention.

More generally, a proxy 104 can map the real identity of a client to a different identity that is appropriate for the server 108. For example, for certain transactions, anonymity is desirable. For others, a group identity 202 such as "Novell Employee", or "Microsoft Certified Systems Engineer" is more appropriate. At other times, the alternative identity 202 might reveal a particular role or digital persona, such as "System Tester" or "marathon runner", so that a more tailored response from the server 108 can be received, or because it is desirable to maintain client 100/102 privacy by revealing only predetermined limited information about the client.

Communications

FIG. 3 further illustrates components of communications 300 between a user 100/102 and proxy 104 and/or between a proxy 104 and a remote site 108. For convenience, the illustrated communication 300 shows several components, but it should be understand that any given packet or exchange of packets 124, 126, 128, 130 between machines will not necessarily contain all of the illustrated components. Indeed, one important aspect of the proxy 104 is its ability to filter out identity information 302 to protect the privacy and/or promote the other legitimate goals of the user 100.

Identity information 302 is information that promotes remote web server 108 identification of the person 100, the user computer 102 used by the person, or both. By contrast, identity-independent information 304 does not assist remote web server 108 identification of the person 100 and does not assist remote web server 108 identification of the user computer 102. Web pages, files, graphics, and other information 308 which is provided by remote sites 108 without regard to the user's identity is identity-independent. Obtaining such information 308 is often the primary reason for a person 100 to visit the site 108. Also, pure history information 306 is identity-independent; although it assists a remote web server 108 in recording a history of the person's interactions with the remote web server 108 it does not include identity information 302. Blended history-and-identity information 310 includes identity information 302 and also assists a remote web server 108 in recording a history of the person's interactions with the remote web server 108. Identity-requesting information 312 requests identity information about at least one of the person 100 and the user computer 102 being used by the person 100.

Methods

Figure 4:
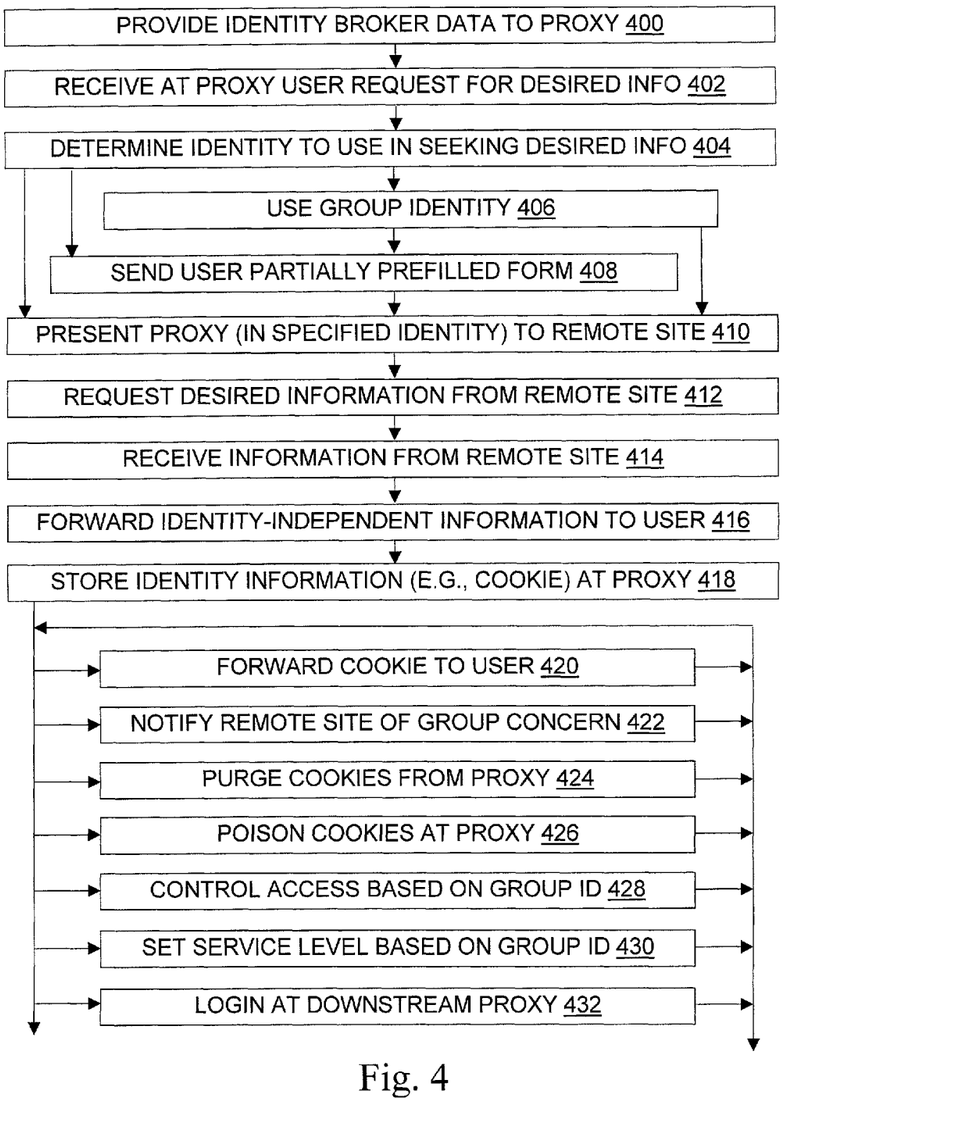
FIG. 4 is a flowchart illustrating methods of the present invention.

FIG. 4 illustrates methods of the present invention. For convenience, several of the steps are shown here even though they are not required in every embodiment of the invention. Steps of inventive methods may be omitted, performed in different orders than those shown, regrouped, repeated, and/or renamed, even when that is not expressly indicated in the Figure or the text, except as required by the claims. Methods may be implemented using various types of software and hardware components and techniques known in the art or developed hereafter. Unless indicated otherwise, discussions of the invention's methods also pertain to the inventive systems (particularly to the proxy 104 and its components such as software 114, identity data 116, and cookie store 120), and vice versa.

Discussion of methods likewise pertains to media such as CDs, DVDs, RAM, ROM, and/or disks which are particularly configured to perform the methods. Suitable storage media include floppy disks, removable storage, hard disks, tape, CD-ROMs, PROMs, RAM, flash memory, and other computer system storage devices. The substrate configuration represents data and instructions which cause the computer system to operate in a specific and predefined manner as described herein. Thus, the medium tangibly embodies a program, functions, and/or instructions that are executable by the proxy 104 and/or network client computers 102 to perform at least one method for managing identities while accessing the Internet.

During an identity instruction providing step 400, the user 100/102 provides the proxy 104 with an identity broker data structure 116 (or equivalently with at least some of the data to be placed in such a structure 116) which specifies a plurality of identities 202 for the user and which also ultimately includes presentation information 206 to identify and/or authenticate the user to a remote Internet site 108. In some embodiments, this step comprises obtaining proxy configuration information 116 through an applet that runs on the user computer 102. In some, it comprises obtaining proxy configuration information 116 through a proxy 104 web page that is accessed from the browser 110 on the user computer 102.

This step 400 generally includes having the proxy 104 authenticate the user 100/102 in some way. This authentication may vary in strength and the means used for the authentication may vary as well, so long as the proxy 104 knows who the user is with sufficient certainty to provide adequate protection against unauthorized changes to the identity broker data structure 116 or cookies 120. This step 400 may be repeated and/or performed in separate operations to provide further identities 202 and/or to change the instructions previously provided to the proxy 104. Although it is shown as the first step, it could also be performed after the proxy 104 receives 402 a user 100 request for site 108 access, or at the same time as such a request.

During a user request receiving step 402, the proxy 104 receives from the user computer 102 a request by the person 100 for desired information from the remote Internet site 108. For instance, the proxy 104 may receive a request to download a web page from an URL given in the request.

During an identity determining step 404, the proxy 104 determines which of the identities 202 of the person 100 should be used in making a corresponding request of the remote Internet site 108 for the desired web page or other desired information. This determination may have been made before any requests were received 402, by virtue of the user 100 logging into the proxy 104 under the specified identity 202. Alternately, the identity 202 to use could be expressly specified in the same communication 124 as the request 402 for a desired web page.

As further illustration of an identity selecting step 404, a step 406 selecting a group identity is expressly shown in FIG. 4. For instance, the group identity 202 might be one that is defined for persons having a shared interest in a particular topic, or it might be one that is shared by persons belonging to a particular organization (including without limitation persons employed by a particular company).

As an example, suppose a corporation funnels all external Internet accesses from browsers inside the corporation through a collection of forward proxies. The corporation has a site license for access to several web sites, and this license is enforced by a collection of passwords (one for each web site). With the present invention, instead of distributing these passwords among all clients 102 within the corporation, the proxies 104 are used to provide passwords as needed to the web sites 108 accessed by the users 100.

Group identities, which are shared by two or more people 100, can also provide particular advantages when the proxy software 114 makes access control decisions and/or quality of service decisions, as noted in steps 428, 430, respectively. Group identities 202 can also be used in advocating 422 the group's interests to managers of a given site 108. Groups may also be entitled to discounts or other favorable commercial treatment; in some cases the remote Internet site 108 provides commercial services or products under the group identity 202 on better commercial terms than the terms on which it provides commercial services or products to other users. Of course, identities 202 other than (or in addition to) group identities may also be used according to some embodiments of the invention.

During a generally optional step 408, the proxy 104 sends the user 100/102 a partially filled form to make it more convenient for the user 100 to login to the remote site 108 that contains the information desired by the user 100. For instance, the proxy software 114 may read the user name and password 206 from the identity broker data structure 116 which correspond to the specified 404 identity, place them in a login form supplied by the site 108, and send the form to the user 100 with buttons allowing the user to either LOGIN using the information 206 or CANCEL the login.

During a presenting step 410, the forward proxy computer 104 presents itself to the remote Internet site 108 in the specified identity 202 using the presentation information 206 for that identity and that site, and requesting the information desired by the user 100. Thus, the site 108 views the proxy 104 as the source of the request, not the user computer 102.

During a receiving step 414, the forward proxy computer 104 receives from the remote Internet site 108 identity information 302 and/or identity-independent information 304. Several packet exchanges, possibly with intervening operational activity by the proxy 104, user 102/100 and/or site 108, may be part of this step. More generally, there is no requirement that steps of the method be atomic in nature, or that they be performed in a transactional manner that permits rollbacks.

During a forwarding step 416, the identity-independent information 304 is forwarded from the proxy 104 to the user computer 102 according to the instructions provided during step 400.

During a storing step 418, the identity information 302 is stored at the forward proxy computer 104 in a storage location 120 (e.g., RAM and/or on disk) which is writable in response to a communication 128, 130 from the remote Internet site 108. For instance, cookies with identity information 302 in them are stored at the proxy 104.

Thus, the forward proxy computer 104 operates transparently in a specified user identity 202 in place of the user computer 102, at least from the perspective of remote Internet sites 108, and the proxy 104 forwards identity-independent information 304 such as desired web pages and files from the remote Internet sites 108 to the user computer 102.

During a generally optional step 420, the forward proxy computer 104 sends the user computer 102 a copy of a cookie that was stored as writable 120 by the remote Internet site 108 at the proxy 104. The user computer 102 may keep 112 or discard the cookie, based upon a browser 110 preference at the user computer 102 which specifies treatment of cookies from the remote Internet site 108. If the cookie is kept, it is preferably not directly writable by the remote site 108. That is, the user computer 102 preferably does not store, at the user computer in a storage location which is written in response to communications from the remote Internet site 108, the same identity information 302 which is stored at the forward proxy computer 104.

During a generally optional step 422, notice is sent to a party responsible for a particular Internet site 108 that persons using the group identity are concerned about the site 108. They may be concerned by apparent privacy violations involving the site, or by apparent violations of another interest (political, economic, or otherwise) that is shared by at least a portion of the persons who are using the group identity 202. They may be concerned by what they perceive as false or misleading information posted at the site 108. They may be concerned by intrusive actions by items sent from the site 108, such as an enabled Javascript to pop-up many web pages, or excessive advertising. Conventional mechanisms for group action are limited, in that advocacy is mainly applied indirectly through the "pressure of public opinion" (e.g., by unfavorable press coverage) or through large business alliances. But if large ISPs were to offer group identities 202 to their retail customers, then group advocacy could be easier and more effective.

During a generally optional step 424, the forward proxy computer 104 purges cookies from the forward proxy computer's store 120. This may be done by deleting the cookies or by other familiar means of effectively deleting data, such as marking the data free for reallocation and/or overwriting it with different data.

During a generally optional step 426, the forward proxy computer 104 poisons cookies by overwriting the cookies with data that was not provided by the remote Internet sites 108 as cookie data. For example, at a forward proxy 104 a "cookie-cruncher" service can be provided to either delete or corrupt cookies when the web sites 108 that employ these cookies are known to be privacy abusers. When a forward proxy 104 can do this for a significant volume of traffic to the offending web sites 108, it provides greater leverage to negotiate an end to abuses of privacy.

During a generally optional step 428, the forward proxy computer 104 distinguishes between users with a particular group identity 202 and those without when making an access control determination. For instance, a public library's forward proxy 104 could map users 100 into two groups: those for whom access restrictions apply when accessing objectionable web sites, and those for whom they don't. These and other economies of scale are available when many users are administered in the same way. Another use of access control at proxies 104 is to provide for efficient in-the-flow content filtering, especially for streaming data. It is efficient to let the proxy 104 apply controls on what is allowed to be forwarded to each party 100, rather than require these decisions made at each end 102, 108. In particular, it is nearly impossible to realize transmission efficiencies that are in a broadcast model of data propagation if the filtering must be done at the origin. Note that in some embodiments the proxy 104 can make an access control decision based at least in part on the specified identity 202 regardless of whether that identity is a group identity 202.

Similarly, during a generally optional step 430, the forward proxy computer 104 distinguishes between users with a particular group identity 202 and those without when setting the service level (e.g., when queuing requests or allocating resources such as disk space and memory). In some embodiments the proxy 104 can make quality of service determination based at least in part on the specified identity 202, regardless of whether it is a group identity 202. In either case, selected users or groups can be provided higher priority and/or preferential allocation of machine and network resources based on their identity 202.

During a generally optional step 432, the forward proxy computer 104 logs the user 100/102 in at a downstream forward proxy using the specified identity 202. Once a user securely logs into a forward proxy 104, that forward proxy is preferably able to automatically login the user at downstream forward proxies (novel or not) and servers. Since the relative security strengths of other logins may be different from that of the user's login at the novel proxy 104 it may become necessary to suppress such automatic logins when there is the possibility that a stronger authentication scheme is needed. For instance, suppose the user's authentication with the proxy 104 is based on a clear-password-over-the-wire scheme, perhaps because the user 100 and proxy 104 are part of the same intra-organization network. It would then be appropriate for the proxy 104 to automatically login 432 the user 100 at sites 108 that do not require cryptographically stronger schemes such as digest authentication, or authentication over an SSL connection.

In addition, in some embodiments the proxy software 114 includes a demographic service that collects data, manages the collected demographic information, and supports use of the collected demographic information in group advocacy approaches similar to the privacy negotiations described above. Demographics and personal profile information collected by a proxy 104 may also be usable for tailored injection or rejection of advertisements, notices, surveys, and other forms of communication with users 100.

Authentication

Authentication is a process through which a web server 108 identifies a user. This is most frequently accomplished through the use of cookies supplied transparently by browsers, or by having the user supply a username-password pair to the web server 108. Authentication can also be accomplished by sophisticated external means such as transparent background exchange of credentials, but since such methods require software that is not commonly available at browsers, they are employed relatively rarely.

For authentication that is performed through the use of cookies, recall that a cookie passed to the server 108 by the proxy 104 represents the substituted proxy-user identity 202, and thus provides authentication. With regard to authentication that is achieved using username-password pair, two needs should be met. First, the username-password pair has to be known to the proxy 104, along with any other supplementary information that is used to establish the proxy-user identity 202 at the server 108. Note that if all we want the proxy to do is to do automatic logins on behalf of the user without identity substitution, then trivially the proxy-user identity is the same as the real identity of the user; that is not the object of the present invention, although it may be permitted. Second, the proxy 104 must supply the necessary response to a server 108 if the server 108 requests authentication. This means that the proxy 104 must recognize that a server 108 has requested authentication, and the proxy 104 must recognize the correct response to send to the server 108. As a side-note, the first issue (recognizing a server request for authentication) does not arise when the authentication as a "proxy-user" is user-initiated, i.e., when it is the user that has directed the proxy 104 to login the user 100 at a web site 108. In the context of all this, consider the following cases.

Case 1.

A server 108 sends an authentication request by sending the authorization failed (HTTP 401) alert, with either basic or digest authentication request (RFC 2617). In this case, it is easy for the proxy 104 to recognize that either a username-password response or a digest response is needed. Whatever the response that is needed, the proxy 104 obtains the necessary username and password information from a presentation information 206, e.g., in a directory 118 through an LDAP server, and supplies it to the server 108.

Case 2.

The server 108 sends a customized "input form" to be displayed at the browser 110. The server 108 may use any combination of Javascript, HTTP form, or similar means to display the input form at the client. Because the request for authentication is not explicitly tagged as such, the proxy 104 does not necessarily recognize it the first time. At this point, the user 100 and the proxy 104 help each other as follows.

Consider the identity substitution example in which the proxy 104 is required to login the user 100 at the web site pseudo-anonymously as "XYZ_Employee_123", i.e., some employee of a company called XYZ Inc. We digress briefly to describe the creation of the associated password, and a browser-proxy message panel.

With regard to password creation, assume that an administrator has created the necessary password information for this pseudo-anonymous identity 202 that the web site 108 will accept (e.g., in connection with a prior licensing arrangement). Alternatively, for sites such as the Yahoo! stock quotes site 108, a pseudo-anonymous identity and password may be created by the user 100. Regardless of who creates the pseudo-anonymous identity, the proxy 104 is assumed to have access to the corresponding password from a secure storage service (such as a secured LDAP server 118). The password is stored at the secure storage service by the creator of the password using the browser-proxy message panel described below.

With regard to the browser-proxy message panel, it is helpful to create a means by which the proxy 104 and browser 110 can convey to each other limited amounts of information. When the user 100 authenticates to the proxy 104, the proxy 104 sends down a Java applet that creates the message panel on the user machine 102.

Returning from the above digression, we continue the description of the login process. The user 100 is presented with the custom page as noted above. The user 100 responds by first clicking a button on the panel that advises the proxy 104 that the user has been presented with an authentication request. The proxy 104 saves a copy of the authentication request message that it had received from the server 108 and sent down to the user 100. Also, the proxy 104 uses the message panel to show the user 100 the pseudo-anonymous identity and the associated password. When the user 100 completes the form fill in, the proxy 104 saves a copy of the filled in login request in the secure store 118.

The "custom" authentication interaction described above may be rarely needed. The next time the user 100 would receive an authentication request 312 from the same server 108, the proxy 104 can match it against the saved copy of the login request that it maintains, and if the two match it can return the saved response. Simple heuristics can be used to keep the performance cost of scanning server 108 messages for authentication fairly low. For instance, it may be sufficient to compare length, tag value, expiration date, and a few octets in the body of most requests 300 in order to determine that they are not authentication messages.

There are two potential obstacles to the above approach. The first is that the password for the pseudo-anonymous identity was revealed to the user 100 via the message panel, so that the user can enter it in the response. This is not acceptable if the password was created by an administrator and placed at the proxy 104 for insertion only in the authentication response sent 128, 130 to the server 108 from the proxy 104. This obstacle is easily overcome by having the proxy 104 ask the user to type in a password that is not the real password, but a distinguishable ASCII string. When the authentication response is then submitted to the proxy 104, it can swap the ASCII string for the actual password and thereby keep the actual password from leaking to the browser 110 and the user 100.

The second obstacle occurs if the authentication request is not a static page. It is possible for the web server 108 to send the custom authentication page with different timestamps (for example) to the browser. This is certainly possible, but we expect it to be improbable because there is no particular reason that a server 108 would vary the format or auxiliary data on such a page. In this case, while the scheme as described above cannot provide the automatic login feature at the proxy 108, it can still support identity substitution and support the human user 100 with assisted login by sending to the browser 102 a filled up response for the authentication page that the user 100 can request with a single click from the proxy.

One might create a software program at the proxy 104, an "authentication wizard", which uses such heuristics as looking for keywords like "Username", "User Id", "Password", "Key", etc., to recognize and react to such requests. But this approach may be disadvantaged at the proxy 104 due to its performance cost and lack of accuracy.

Overall, the approach described here extends other approaches in which authentication that is user-initiated is made convenient at the browser machine 102 itself. Two examples of such approaches are the Novell DigitalMe project (see, e.g., commonly owned copending application Ser. No. 09/670,783 filed Sep. 27, 2000), and the Obongo webbar. Our extension is in at least these directions: (a) by moving the authentication to a proxy 104, we open the door to a wider variety of identity substitutions than are possible at the browser, (b) we address server-initiated authentication as well, although we cannot easily automate the discovery phase of such authentication if a server 108 uses custom and non-static login request forms, and (c) by instituting the service at a forward proxy 104 instead of a browser 110, we gain independence from the operating system and browser software on the client machine 102.

Case 3.

SASL, and other directed authentication schemes. Much of the difficulty we confronted in case (2) was in recognizing a server initiated authentication request. In case (2), the server could define a non-standard authentication request, and the response message that the proxy 104 must issue on user's behalf is non-standard as well. Hence the proxy is forced to function as a "record-and-replay" device in order to automate authentication.

Happily, one approach currently underway would enable proxied authentication. It is a protocol layer called the "Simple Authentication and Security Layer" (SASL); SASL is described in standards document RFC 2222. SASL defines an explicit protocol for initiating and specifying the desired authentication scheme. Because it is explicit, and specifies a broad variety of standardized authentication schemes, it is straight-forward for a forward proxy 104 to intercept, interpret, and respond to the authentication request just as flexibly as a browser 110 can do. SASL is currently deployed at various LDAP servers, but it appears not to be in common use yet at web servers 108.

Another approach that would facilitate proxied authentication is the use of eXtensible Markup Language (XML) in place of HTML for web documents, since XML documents provide information in a form readily useable by proxies 104.

Case 4.

Auto-initiate client login in response to HTTP 403 error.

Case 5.

Authentications over SSL: Standard or Custom. SSL is widely used to provide authenticated and encrypted machine-to-machine channels. For many interactions where privacy and accountability are paramount considerations, the accepted method is to set up an SSL channel, and then perform a user authentication on the SSL connection before proceeding with the interaction.

For a proxy to perform automated authentication in these cases, it is assumed that the user trusts the proxy just as completely as the user trusts the browser. With this qualification, an end-to-end SSL channel between the user 100 and the server 108 is replaced by two SSL channels: one between the user 100 and the trusted proxy 104, and a second one between the proxy 104 and the server 108. Because the proxy 104 is not just an SSL tunnel between the two parties in this arrangement, it can see the request-response traffic and handle authentication requests as described in Case (1) and Case (2).

We expect however, that in any transaction in which the real user identity is revealed for other reasons (e.g., credit card numbers, or other strictly personal information), proper identity substitution will be rare. So even though the authentication over an encrypted end-to-end channel can be automated at the proxy 104 by splitting the end-to-end channel into two encrypted channels, it is likely that automated logins for substituted identities will be less interesting for pragmatic and liability reasons.

Comments on Other Approaches

Novell's DigitalMe™ group has formulated the notion of a server that is capable of receiving and providing pre-filled forms for each persona that a user may wish to employ (DigitalMe is a mark of Novell, Inc.). The DigitalMe server is one-click away from the user, independent of which web site the user visits, and therefore can be invoked easily. This technology is discussed in commonly owned copending application Ser. No. 09/670,783 filed Sep. 27, 2000. While form-filling is discussed in both cases, form-filling by itself is not claimed. The present invention's proxy 104 adds a richer capability by mapping roles/personas directly to another component of the identity puzzle, namely, cookies. Because it is a proxy 104 through whom other users may navigate as well, identity modification at the proxy 104 to implant group identities and group policies, and to leverage group behavior for advocacy reasons, also becomes more practical. The DigitalMe approach does not extend as easily to providing access control and quality of service benefits based on user identities, in part because there are two different sessions: one with the DigitalMe service, and the other with a forward proxy through whom the user navigates the web.

Some web sites provide anonymity by effectively acting like forward proxies. They receive user requests, perform the requested accesses by using fictitious identities, and return the results. But because these anonymizing web sites cannot always anticipate what long term end-to-end state a server may want to maintain with a user, they are prone to failure. They may also face another significant hurdle: the performance hit can be significant. Because a forward proxy is often on a local-area-network with the user, the overhead of communications with a forward proxy 104 functioning as an anonymizer can be very small compared to that of an anonymizer service that runs at a greater distance from the user. Finally, the user is still less secure with a non-local anonymizer service than an anonymizer that also happens to be a local forward proxy 104, because the proxy 104 is local both in connectivity and terms of administrative oversight.

By tacit convention, a forward proxy must often function as an application-level router. Proxying software may have some additional features, but often it provides relatively little fine-grained and fine-tuned control over the machine that hosts it. Conventional network quality of service solutions tend to apply at the router level, by conserving the hardware bandwidth guaranteed to specific network addresses. The present invention provides a softer and more fine-grained quality of service discipline, which operates at the session level on a proxy machine 104, by reserving the proxy's resources for users based on their individual identification 202 to the proxy 104.

Additional Implementation Details

Particular implementations of the present invention may benefit from some or all of the following information. In some embodiments, the invention is integrated in an Internet access system whose identity services provide a foundation for initiating and verifying user identity (authentication), managing identity across multiple back end services (single sign-on), and personalizing and targeting in-line services that run on the access system's platform. The proxy 104 acts as both server and client; it acts as a server to the browsers 110 that make web requests and as a client to the origin web servers 108 that respond to those requests. This dual nature helps the system respond quickly to requests from web users, while offloading backend services from the resource-consuming task of identity management and tracking.

Figure 5:
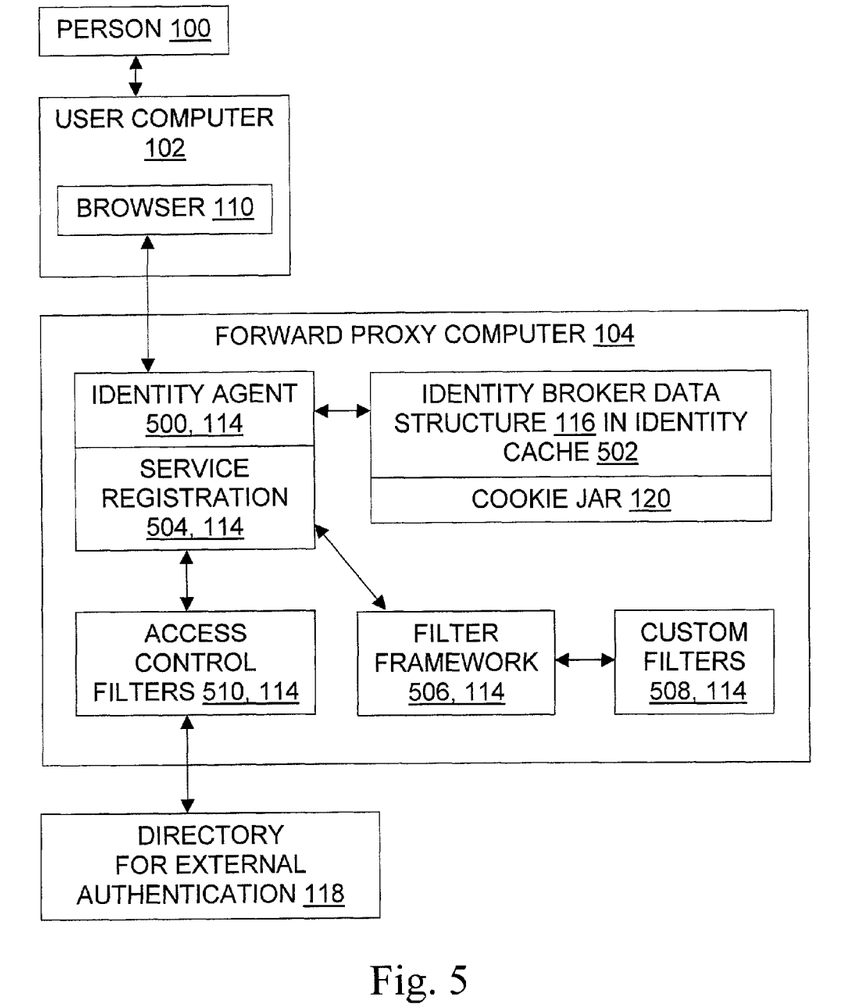
FIG. 5 is a diagram further illustrating an embodiment of the invention, with particular attention to the software and other components on the forward proxy computer.

As illustrated in FIG. 5, in some embodiments the system infrastructure includes three main components and interactions: an identity agent 500, an identity cache 502, and a service registration module 504. In order to extend the identity services to other services within the environment, these primary components can interact with a filter framework 506, custom filters 508, access control filters 510, and/or external directories 118.

The identity agent 500 identifies and authenticates users 100, tracking their movements within the proxy 104 environment. The identity agent 500 also informs all identity-aware services when users enter or leave the system. The identity agent 500 also manages an identity cache 502, which is one example of a location to hold the identity broker data structure 116. The identity cache 502 is a RAM-based storage location for user-specific attributes and data. Each service (e.g., filtering, quality-of-service control, access control, demographics collection, ad insertion) that leverages the identity services specifies the identity information 116 that it deems important and the identity agent 500 keeps track of that information on an individual user 100 basis for each service. In one embodiment, the identity agent 500 provides an API having a registration part which returns a unique handle for subsequent requests to access and/or set user 100 information, a data access part, and an authentication query and initiation part.

With respect to registration, entity registration with identity agent 500 is required prior to the entity accessing and/or setting user 100 identity information. The registration process will return a unique handle to be used for communication when accessing/setting user 100 information. During registration the registering entity may set callback functions for session initiation and termination, and provide a function that will be called for each unique event per user per proxy service.

With respect to user data access, once an entity is registered, user data access may be performed on a per proxy service basis. The data will be named and a length of data will be provided, as will persistence flags and a time to live value for the validity of the data. An optional TTL value is used to determine if the data can be transmitted to an identity agent 500 residing on another proxy 104, and to remove old data upon user authentication to the system and/or in the process of archiving user information.

With respect to authentication, query and initiation for the user 100 is preferably also supported. This will allow any registered party to check what type of authentication the user 100 has given and to request that a user 100 also be authenticated via a specific authentication profile.

The identity cache 502 in some embodiments is non-persistent, maintaining user attributes and data only for the duration of the current session. In other embodiments, the identity cache 502 includes persistent disk storage that can maintain certain user attributes and data 116 between sessions. In some embodiments, the cookie jar 120 is part of the identity cache 502.

The identity services utilize the service registration module 504 to keep track of all services that are interested in user identity. The identity agent 500 uses this list to communicate user activities to all identity-aware services.

The filter framework 506 provides a foundation for delivering certain custom services on the platform. The filter framework 506 supports major functionality behind core acceleration services as well as a variety of value-added services (e.g., URL transformation, content filtering, or advertisement injection) that may have differing needs with regard to when and how the flow of data needs to be modified. It parses and matches content as it flows through the proxy engine 104 and coordinates the activity between the client 102 side and the server 108 side of the proxy 104. The filter framework 506 may be combined with identity services to provide flexibility to the environment by making incoming requests and outgoing data available for modification at critical points or phases across the data flow. Each of these phases act as a filter point from which the proxy 104 can store and/or retrieve data related to each object involved in the request. This "metadata" concerning each object can be used to extend, modify or prevent the request according to a pre-determined set of identity based rules or policies.

The filter framework 506 preferably provides a simplified API for hooking filters into the proxy 104 environment. The identity agent 500 interacts with the filter framework 506 to pass required identity information through to the requesting filters. This can simplify the creation of custom and third party filters.

Custom filters 508 extend the capabilities of the system by delivering functionality such as URL and content filtering. Identity services allow these filtering services 508 to leverage user identity information to apply filters customized to specific customer 100 preferences rather than broadly defined and generic filters. Services can choose whether or not to leverage the filter framework 506, access control filters 510, and/or custom filters 508 by interaction with the identity services.

The system identity services may support the integration of external identity services 118 such as LDAP directories, so that organizations do not have to create multiple identity stores for managing relationships. Support may be included for RADIUS and/or LDAP authentication, for instance. In the embodiment shown in FIG. 5, the directory for external authentication 118 is linked to the access control filters 510, 114. In other embodiments, the external directory 118 is linked to the identity agent 500, 114 for authentication and optionally linked to the access control filters 510, 114 for access control policy enforcement. That is, user identifying policy information may be stored internally on the box 104 or it may reside in an external directory.

With respect to LDAP directory authentication, administrators can configure the identity services software 114 of the proxy 104 with a list of multiple LDAP directories that it will check for authentication credentials. The identity services portion of the software 114 queries each listed LDAP directory until it can either verify or reject the credentials. Identity services software 114 can be configured to use the LDAP distinguished name (DN), e-mail address, or any other globally unique LDAP field. As the situation requires, identity services software 114 can also pass LDAP credentials to its defined LDAP directories using either secure HTTPS or unsecured HTTP.

With respect to RADIUS authentication, for enterprises that have a dial-up access implementation, identity services software 114 can utilize standard Remote Authentication Dial-In User Service (RADIUS) protocols to verify users' credentials. Identity services software 114 may allow administrators to configure a list of multiple RADIUS servers to use for checking authentication credentials. Identity services software 114 queries each listed RADIUS server until it can verify or reject the user's credentials.

Where global access is permitted to an organization's web content, identity services software 114 can employ an authentication scheme that simply identifies users 100/102 based on their IP address. These global access controls use IP addresses or IP subnets to determine whether to deny or allow a given URL request. Organizations might employ global access controls as baseline access for less sensitive content or generic content that they want to make more accessible to the general web public. Global access controls are applied universally across all services running on the system.

In some embodiments, digital certificate based and NDS based authentications are supported. In addition to username/password authentication options, identity services software 114 can support digital certificate authentication, known as SSL mutual authentication. Mutual authentication leverages X.509 client and server certificates to identify the user 100/102. SSL mutual authentication can also be linked with one of the username/password authentication mechanisms described above in a multi-factor authentication scheme that requires both certificate swapping and username/password verification to allow access. In this case, the name in the user certificate must match the username used to authenticate.

For content that needs granular access controls, identity services software 114 can combine a given authentication methodology with a cookie-based authentication process that creates a unique identifier for each user. The resulting "identity cookie" enables identity services software 114 to track, manage, and control the user's access within the organization's web environment. This can be done using technology described in commonly owned copending application no. Ser. No. 09/484,691 filed Jan. 18, 2000, which is incorporated herein. The identity cookie is a short-term identifier that is only valid for the duration of a single user session, thereby limiting the value of "hi-jacking" a user's identity cookie for unauthorized activities. Administrators can also create policy sets on a per user and/or per object basis.

CONCLUSION

The present invention provides tools and techniques by which a properly configured forward proxy can perform identity substitutions and related services. The user provides the forward proxy with identity information, and the forward proxy presents itself to remote Internet sites on behalf of the user in the guise of the specified identity. From the remote site's point of view, the forward proxy is the machine being used by the user; the identity of the actual user machine can be hidden. Cookies are thus stored and updated at the forward proxy instead of being stored and updated at the user computer as they would be if a conventional forward proxy had been used. This helps preserve user privacy. The use of group identities, which are shared by multiple users, are also facilitated.

Particular systems, signals, methods, apparatus, and articles embodying the present invention may be expressly described herein. However, unless otherwise expressly indicated, the description herein of any type of embodiment of the present invention extends to corresponding embodiments of other types.

As used herein, terms such as "a" and "the" and designations such as "identity", "user", and "proxy" are inclusive of one or more of the indicated element. In particular, in the claims a reference to an element generally means at least one such element is required.

The invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing identities while accessing the Internet, the method comprising the following steps performed with a forward proxy computer:

acquiring from a person by the forward proxy computer data that is placed by the forward proxy computer in an identity broker data structure defining a plurality of different identities for said person, and acquiring data that defines presentation information to identify and/or authenticate the forward proxy computer to a remote Internet site using one of said plurality of identities, the forward proxy computer acts on behalf of the person in interactions with the Internet site and preserves the anonymity of the person during those interactions with and between the remote Internet site, and the forward proxy computer supplies information to the remote Internet site to gain access thereto but preserves the anonymity of the person in that interaction;

receiving, by the forward proxy computer and from a user computer, a request by the person for desired information from the remote Internet site, the user computer configured to directly interact with the forward proxy computer, and the person via the user computer initially logs into the forward proxy computer and provides instructions to the forward proxy computer to communicate with the remote Internet site and to not reveal a true identity of the person or user computer to the remote Internet site, and the user computer retains administrative oversight of the forward proxy computer;

determining, by the forward proxy computer, which of the plurality of identities of the person should be used as a specified identity in making a corresponding request of the remote Internet site for the desired information;

presenting, by the forward proxy computer, the specified identity to the remote Internet site, the specified identity presented by using the presentation information, and masking the true identity of the person via the specified identity to preserve the anonymity of the true identity with respect to the remote Internet site;

requesting, by the forward proxy computer, the desired information from the remote Internet site in a communication by identifying the forward proxy computer as the source of the request, via the specified identity, so as to not identify the user computer;

receiving, by the forward proxy computer and from the remote Internet site identity information that identifies the forward proxy computer as the requester and identity-independent information;

forwarding, by the forward proxy computer, the identity-independent information to the user computer;

storing the identity information by the forward proxy computer in a storage location at the forward proxy computer, the identify information being stored as a cookie that can be written to by the remote Internet site in response to a communication from the remote Internet site; and transparently operating the forward proxy computer relative to the remote Internet site as the specified identity in place of the user computer and forwarding identity-independent information from the remote Internet site to the user computer, and providing by the forward proxy computer identity substitution and identity mapping on behalf of the person.

2. The method of claim 1, wherein the determining step determines that the forward proxy computer should use a group identity which is shared by multiple persons.

3. The method of claim 2, wherein the group identity is shared by persons having a shared interest in a particular topic.

4. The method of claim 2, wherein the group identity is shared by persons belonging to a particular organization.

5. The method of claim 2, wherein the method further comprises notifying a party responsible for a particular Internet site that persons using the group identity are concerned by apparent privacy violations involving the site.

6. The method of claim 2, wherein the method further comprises notifying a party responsible for a particular Internet site that persons using the group identity are concerned by apparent violations at the site of an interest shared by at least a portion the persons who are using the group identity.

7. The method of claim 2, wherein the method further comprises notifying a party responsible for a particular Internet site that persons using the group identity are concerned by false or misleading information posted at the site.

8. The method of claim 2, wherein the method further comprises notifying a party responsible for a particular Internet site that persons using the group identity are concerned by intrusive actions by items sent from the site to such persons.

9. The method of claim 2, wherein the method further comprises the forward proxy computer distinguishing between users with the group identity and those without when making an access control determination.

10. The method of claim 2, wherein the method further comprises the forward proxy computer distinguishing between users with the group identity and those without when making a quality of service determination.

11. The method of claim 2, wherein the remote Internet site provides commercial services or products under the group identity on different commercial terms than the terms on which it provides commercial services or products to other users.

12. A non-transitory computer-readable storage medium storing computer readable instructions which when executed by a forward proxy computer cause the forward proxy computer to perform the method comprising:
receiving, by the forward proxy computer from a user, data which specifies a plurality of different identities for the user, and acquiring data which also includes presentation information to identify and/or authenticate the forward proxy computer as one of said plurality of identities of the user to a remote Internet site, the forward proxy computer acts as a proxy on behalf of the user in interactions with the remote Internet site and is operated for preserving the anonymity of the user during those interactions with the remote Internet site by masking a true identity of the user from the remote Internet site, and the forward proxy computer supplies information to gain access to the remote Internet site but preserves the anonymity of the identity of the user during that interaction, and the forward proxy computer operates on behalf of the user to provide identity substitution and identity mapping between the user and the remote Internet site;
receiving, by the forward proxy computer from a user computer a request by the user for desired information from the remote Internet site, the user computer is configured to directly interact with the forward proxy computer, and the user via the user computer initially logs into the forward proxy computer and provides instructions to the forward proxy computer to not reveal a true identity of the user or user computer to the remote Internet site, and the user computer and the forward proxy computer communicate with one another via Hypertext Transfer Protocol (HTTP) and the user via HTTP communications and the user computer retains administrative oversight of the forward proxy computer;
determining by the forward proxy computer which one identity of the plurality of identities of the user should be used as a specified identity in making a corresponding request of the remote Internet site for the desired information, and acquiring the specified identity from storage of the forward proxy computer;
presenting by the forward proxy computer the specified identity to the remote Internet site by using the presentation information;
requesting by the forward proxy computer the desired information from the remote Internet site in a communication which identifies the forward proxy computer as the source of the request via the specified identity, and which does not identify the user computer;
receiving by the forward proxy computer from the remote Internet site identity information that identifies the forward proxy computer as the requesting source and receiving identity-independent information;
forwarding by the forward proxy computer the identity-independent information to the user computer; and
storing by the forward proxy computer the identity information in a storage location at the forward proxy computer, the identity information stored as a cookie that can be written to by the remote Internet site in response to a communication from the remote Internet site;
transparently operating the forward proxy computer relative to the remote Internet site using the specified identity and forwarding identity-independent information from the remote Internet site to the user computer.

13. The configured medium of claim 12, wherein the user computer does not store, at the user computer in a storage location which is written in response to communications from the remote Internet site, the same identity information which is stored at the forward proxy computer.

14. The configured medium of claim 12, wherein the determining step determines that the forward proxy computer should use a group identity which is shared by multiple persons.

* * * * *